United States Patent [19]
Groezinger et al.

[11] Patent Number: 6,047,081
[45] Date of Patent: Apr. 4, 2000

[54] IMAGE PROCESSING SOFTWARE SYSTEM HAVING CONFIGURABLE COMMUNICATION PIPELINES

[75] Inventors: John L. Groezinger, Cottage Grove; James W. Albers, St. Paul, both of Minn.

[73] Assignee: Imation Corp., Oakdale, Minn.

[21] Appl. No.: 08/957,197

[22] Filed: Oct. 24, 1997

[51] Int. Cl.[7] .................................................. G06K 9/00
[52] U.S. Cl. ........................................ 382/128; 382/307
[58] Field of Search .................................... 382/128, 304, 382/307, 284; 707/104; 709/236, 238, 246; 712/225

[56] References Cited

U.S. PATENT DOCUMENTS

| | | | |
|---|---|---|---|
| 4,604,686 | 8/1986 | Reiter et al. | 364/200 |
| 4,958,283 | 9/1990 | Tawara et al. | 364/413.13 |
| 5,060,140 | 10/1991 | Brown et al. | 364/200 |
| 5,155,852 | 10/1992 | Murakami et al. | 395/725 |
| 5,329,445 | 7/1994 | Mukai | 364/413.01 |
| 5,339,413 | 8/1994 | Koval et al. | 395/650 |
| 5,410,675 | 4/1995 | Shreve et al. | 395/500 |
| 5,457,784 | 10/1995 | Wells et al. | 395/829 |
| 5,630,101 | 5/1997 | Sieffert | 395/500 |

OTHER PUBLICATIONS

"Challenges encountered while implementing a multi–vendor teleradiology network using DICOM 3.0," Levine et al., SPIE vol. 3035, ISSN 0277–786X, Proceedings of the SPIE—the International Society for Optical Engineering, Feb. 1997, XP–002073092, pp. 237–246.

*Primary Examiner*—Andrew W. Johns
*Attorney, Agent, or Firm*—William K. Weimer

[57] ABSTRACT

A method and software system for processing images having reconfigurable communication pipelines. The system includes an image processor that instantiates a film module and dynamically creates an image module for each image to be processed. The image processor couples each image module to the film module by a unique communication pipeline according to imaging commands received from an input imaging device. The present invention is applicable to the general field of image processing and may be implemented in any general image output device. In one embodiment, the software system is embedded in a discrete continuous tone laser imager that is directly connected to one or more medical imaging modalities. In another embodiment, the laser imager is directly connected to a network of medical imaging modalities. In yet another embodiment, the software system is executed by an intermediate computer that interfaces an output imaging device to a plurality of networked medical imaging modalities. Advantages of the present invention include the dynamic creation of an image processing system, thereby effecting great flexibility. In this manner, the system is easily reconfigurable and therefore suitable to network environments requiring a variety of image formats. Furthermore, the system does not rely on specialized hardware or virtual memory which greatly increase the cost of the device.

36 Claims, 2 Drawing Sheets

IMAGE PROCESSING SOFTWARE SYSTEM HAVING CONFIGURABLE COMMUNICATION PIPELINES

FIELD OF THE INVENTION

This invention relates generally to the field of image processing, and more particularly to a method and system for image processing using configurable communication pipelines.

BACKGROUND

An imaging system typically includes an input imaging device that generates image information, and an output imaging device that forms a visible representation of the image on an imaging element based on the image information. In a medical imaging system, for example, the input imaging device may include a diagnostic device, such as a magnetic resonance (MR), computed tomography (CT), conventional radiography (X-ray), or ultrasound device. Alternatively, the input imaging device may include a user interface device, such as a keypad, mouse, or trackball, which is also capable of generating medical image information. As a further alternative, the input imaging device may include an image archival workstation for retrieving archived images. In one embodiment, the output imaging device in a medical imaging system is a digital laser imager. In this embodiment, the laser imager exposes and develops the imaging element in response to the image information to form the visible representation of the image. Alternatively, the laser imager may combine multiple images into an "image page" and expose the imaging element to form a visible representation of the images. In another embodiment, the output imaging device is a softcopy output device such that the imaging element is a conventional display device for displaying the image information.

The image information generated by the input imaging device includes image data containing digital image values representative of the image, and imaging commands specifying operations to be performed by the laser imager. Each of the digital image values corresponds to one of a plurality of pixels in the original image, and represents an optical density associated with the respective pixel. In response to an imaging command, the laser imager converts the digital image values to generate laser drive values used to modulate the intensity of a scanning laser. The laser drive values are calculated to produce exposure levels, on the imaging element, necessary to reproduce the optical densities associated with the pixels of the original image when the media is developed, either by wet chemical processing or dry thermal processing.

Prior to imaging the media, an output imaging device may perform a number of additional operations on the image data to produce a variety of different format or appearance characteristics. For example, the output imaging device may apply numerous mathematical filters and transformations to the image data. In addition, the output imaging device may resize the image data in order to form a properly sized visible representation of the image. Furthermore, the image data may need to be rotated prior to imaging the media. The output imaging device performs image processing operations as a result of imaging commands from the input imaging device or due to other system variables such as the size of the imaging element or the resolution of the laser imager.

Because image processing is computationally intensive, many imaging systems incorporate specialized hardware designed to perform specific operations. The cost of specialized image-processing hardware, however, is extremely expensive and may prohibit incorporating such hardware into a laser imager. Other imaging systems incorporate sophisticated software algorithms that are optimized to reduce system requirements for image processing. These software algorithms, however, are inflexible and often require reprogramming in order to modify the image processing. Due to their lack of flexibility, conventional imaging systems are not well suited for asynchronous image processing requests received from the input imaging device. Furthermore, such imaging systems often require a complex operating system and virtual memory which are not well-suited for real-time applications and increase the overall cost of the medical imager.

For the reasons stated above, and for other reasons stated below which will become apparent to those skilled in the art upon reading and understanding the present specification, there is a need in the art for a flexible image processing system capable of executing a variety of data operations without requiring specialized hardware. There is also a need for an image processing system that is easily configured in response to imaging requests received from a variety of input imaging devices.

SUMMARY OF THE INVENTION

As explained in detail below, the present invention is directed to a method and system for processing image data using dynamically reconfigurable communication pipelines.

In one embodiment, the invention is a software system for processing image data of one or more images from at least one input imaging device for output on an imaging element. The software system includes an image module for each of the images received from the input imaging device such that each image module applies at least one image processing function to the image data of the respective image, thereby generating processed image data. A film module defines a format for the imaging element such that the imaging element has at least one data region and that each data region is associated with one of the image modules. The software system further includes a communication pipeline for each of the image modules for communicating the processed image data of the image module. An image processor governs the software system and is responsible for instantiating the film module, instantiating each image module, instantiating each communication pipeline and communicatively coupling each image module to the film module via the respective communication pipeline such that the film module receives the processed image data from the image modules and generates output data for forming the images on the imaging element.

In another embodiment, the image processor selects at least one image processing operation for each image received from the input imaging device. The image processor configures the corresponding image module to perform the selected operation. For example, in one embodiment, the image processing operation comprises applying a data filter to the image data. Additionally, the image processor may construct the data filter as a function of at least one stored data operator for performing a convolution operation.

In another embodiment, the software system further includes an image pump communicatively coupled to the film module. The image pump receives the output data from the film module and drives an output device to form the images on the imaging element.

In another embodiment, each of the image modules, the film module, the image processor and the communication pipelines are written in an object-oriented software language.

In yet another embodiment, the image module represents an image box as defined by the DICOM protocol and the film module represents a film box as defined by the DICOM protocol.

According to another aspect, the present invention is a computer for processing image data of one or more images received from at least one client and composing an image page for output on an imaging element. The computer comprises a storage device storing a software system for processing image data using configurable communication pipelines and the above-detailed software components including the image modules, the film module, the communication pipelines and the image processor. The computer further includes a random-access memory (RAM) for holding the instantiated software components and a central-processing unit (CPU) coupled to the storage device for executing the software system.

According to another aspect, the invention is a computer-readable storage medium having an object-oriented software system executable on a suitably configured computer for processing image data of one or more images received from at least one client to compose an image page for output on an imaging element.

According to yet another aspect, the invention is a medical imaging system comprising one or more clients on a network, a medical output imaging device, and an object-oriented software system executing on a suitably configured computer within the medical output imaging device for processing image data of one or more images for output on an imaging element by the medical output imaging device.

These and other features and advantages of the invention will become apparent from the following description of the preferred embodiments of the invention.

DETAILED DESCRIPTION

In the following detailed description, references are made to the accompanying drawings which illustrate specific embodiments in which the invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
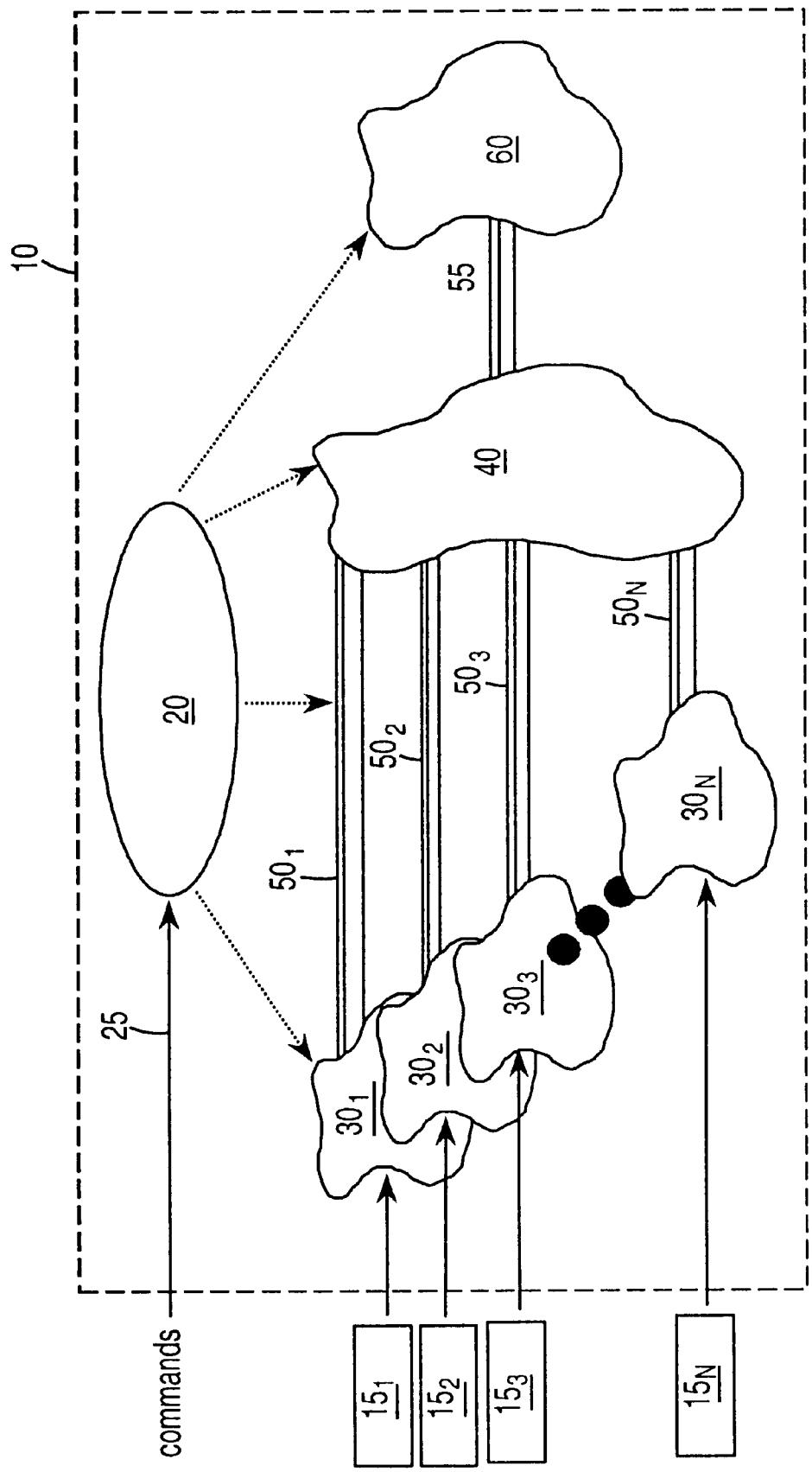
FIG. 1 is a functional block diagram of a software system suitable for processing a plurality of images in accordance with the present invention.

The present invention effects a reconfigurable software system for processing a plurality of images. FIG. 1 is a functional block diagram of a software system 10 for processing images 15 in accordance with the present invention. Software system 10 includes image processor 20, one or more image modules 30, film module 40, one or more communication pipelines 50, communication pipeline 55 and image pump 60.

Typically, software system 10 resides in an output imaging device such as a medical imager manufactured by Imation including the DryView™ 8700 or DryView™ 8300 continuous tone laser imagers. In this case, software system 10 executes on an computer embedded within the output imaging device. The embedded computer typically comprises a central-processing unit (CPU) for executing software system 10 and a read-only memory (ROM) or an embedded storage media for storing software system 10.

The output imaging device may reside directly on a network, in which case software system 10 receives images 15 from a variety of clients (not shown), such as magnetic resonance (MR), computed tomography (CT), conventional radiography (X-ray), and ultrasound devices, manufactured by a number of different manufacturers, such as Siemens, Toshiba, GE, or Picker. In one alternative, however, the output imaging device is not connected to a network but is directly connected to one or more clients.

Alternatively, the output imaging device does not directly reside on a network but is coupled to the network via an intermediary computer. In this case, software system 10 may not reside within the output imaging device but may reside within the intermediary computer itself. The intermediary computer typically has a random-access memory (RAM), a read-only memory (ROM), a central-processing unit (CPU) and a storage device, such as a hard disk drive or disk drive. Software system 10 typically resides on the storage device of the intermediary computer and is copied into RAM and executed therefrom by the CPU. Where the storage device is a disk drive or other removable storage device, software system 10 can be stored on the storage medium for insertion into the device. The present invention is not, however, limited to any particular hardware implementation.

Referring again to FIG. 1, image processor 20 configures software system 10 in response to image commands 25 received from at least one input imaging device. Commands 25 may be a variety of communication protocols such as 831, 952, SuperSet and DICOM. Image processor 20 receives a plurality of images 15 to be processed as well as specific image processing commands via commands 25.

For each image 15, image processor 20 instantiates a corresponding image module 30 by allocating sufficient data space in a random access memory (RAM). In this manner, a plurality of image modules 30 may exist simultaneously, depending upon image commands 25. Each image module 30 is associated with an image 15 received from an input imaging device and encapsulates all relevant information regarding the corresponding image such as number of rows, number of columns and image polarity.

Image processor 20 determines any image processing operation to be performed on each image 15 and configures the respective image module 30 to perform the operation. In one embodiment, image processor 20 selects a lookup table from a set of stored lookup tables and configures image module 30 to process the image data of the corresponding image 15 according to the selected lookup table. In another embodiment, image processor 20 constructs a data filter as a function of at least one stored data operator for performing a variety of convolution operations including enlarging or reducing corresponding image 15. Image processor 20 determines the appropriate image processing operation for each image 15 based on commands 25, which may include a number of user selectable parameters such as a desired contrast value or density value, as well as other inherent characteristics of the output imaging device. Furthermore, each image module 30 may be configured to sequentially perform a plurality of image processing operations by assignment of two or more data filters. The particular function of the assigned image processing operation is not critical; however, it is preferred that each data filter be configured such that a resulting size of the processed image data produced by each data filter matches an expected size of the next data filter to be applied.

After each image module 30 has been instantiated and configured for the proper image processing operations, image processor 20 instantiates a plurality of communication pipelines 50 and binds each communication pipeline 50 with a corresponding image module 30. Each communication pipeline 50 acts as a data pipe for communicating processed image data. For example, as image module 30 processes the corresponding image 15, the processed image data is serially placed into the corresponding communication pipeline 50. Alternatively, image module 30 inserts pointers to buffers containing processed image data into communication pipeline 50. Preferably, image processor 20 instantiates communication pipelines 50 so as to avoid fragmentation, thereby improving communication performance.

After instantiating communication pipelines 50, image processor 20 instantiates film module 40 according to a format parameter specified by imaging commands 25 and communicatively couples each image module 30 to film module 40 by binding film module 40 to the respective communication pipeline 50. The format parameter of film module 40 defines the number of images to be formed on a single imaging element. In this manner, film module 40 defines a data region of the imaging element for each image module 30. Furthermore, film module 40 encapsulates all relevant information regarding the data regions including the placement of each data region on the imaging element and the total number of data regions. For example, if a single data region is requested by commands 25 (i.e., a "one-up" format), image processor 20 instantiates film module 40 such that one image is formed on the imaging element. Similarly, if two data regions are requested (i.e., a "two-up" format), image processor 20 instantiates film module 40 such that two images are properly scaled and formed on the imaging element.

Figure 2:
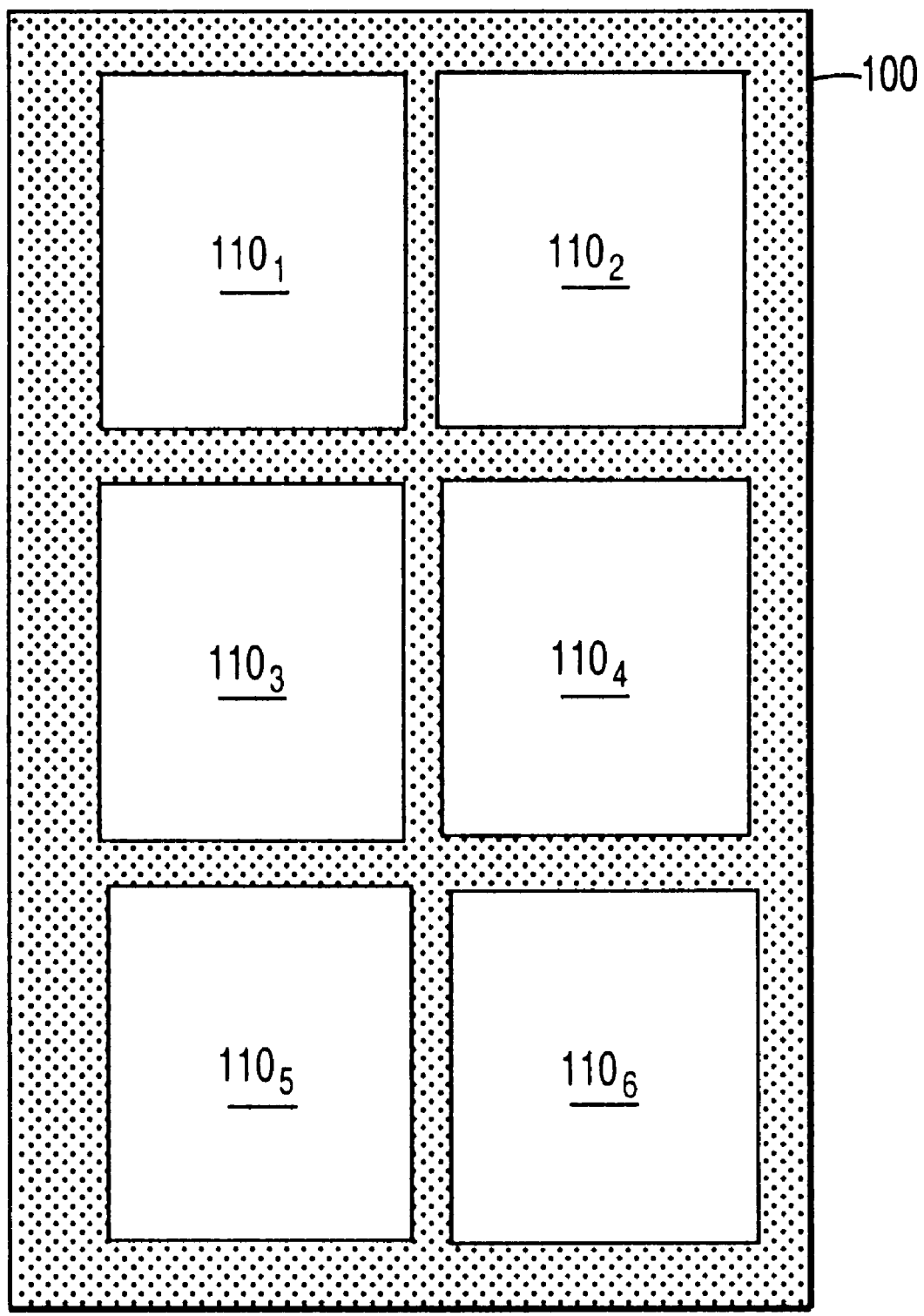
FIG. 2 is a front view of a plurality of images formed on a single imaging element.

FIG. 2 illustrates one embodiment of an imaging element having six data regions in portrait orientation. Imaging element 100 has six data regions $110_1$ through $110_6$. A visual representation of a unique image is formed on each data region 110 of imaging element 100. Thus, each data region 110 corresponds to one of the image modules 30 and, therefore, one of the images 15. In this fashion, each data region 110 of imaging element 100 is associated with a particular image module 30 and the corresponding image 15.

After binding image modules 30 to film module 40 via communication pipelines 50, image processor 20 commands each image modules 30 to begin processing the corresponding image 15. Film module 40 retrieves the processed image data from communication pipelines 50 and orders the processed image data to generate a stream of output data. More specifically, film module 40 retrieves the processed image data and builds at least one scan line of output data. In one embodiment, film module builds a plurality of scan lines to define an entire page of output data.

Image processor 20 instantiates image pump 60 and communicatively couples image pump 60 to film module 40 via communication pipeline 55. Film module 40 serially places the output data into communication pipeline 55. Alternatively, film module communicates pointers to buffers of output data into communication pipeline 55. Image pump 60 sequentially extracts the output data from communication pipeline 55 and drives an output device (not shown) to form a visible representation of images $15_1$ through $15_N$ on an imaging element as illustrated in FIG. 2.

Implementation of One Embodiment of the Software System of the Present Invention In one embodiment, image processor 20, image modules 30, film module 40, communication pipelines $50_1$ through $50_N$, communication pipeline 55 and image pump 60 are implemented as objects in an object-oriented software system. Furthermore, it is preferrable that each object contains its own thread of execution. In one embodiment, image processor 20, image modules 30, film module 40 and image pump 60 are implemented as worker threads using Microsoft Windows NT as an underlying operating system. In another embodiment, each object is executed as an independent thread using a real-time operating system such as PSOS by Integrated Systems.

Various embodiments of an image processing software system having configurable communication pipelines have been described. The present invention is applicable to the general field of image processing and may be implemented in any general image output device or a softcopy display device. In one embodiment, the software system is embedded in a continuous tone digital laser imager either directly coupled to one or more medical imaging modalities or connected to a network of medical imaging modalities. In yet another embodiment, the software system is executed by an intermediate computer interfacing an output imaging device to a plurality of networked input imaging devices. In another embodiment, the software system is embedded in an output imaging device which is a softcopy output device having a conventional display device as an imaging element for displaying image information.

Several advantages of the present invention have been illustrated including the dynamic instantiation of an image processing system. The system is therefore easily reconfigured and thus suitable to network environments which typically require a variety of image formats and characteristics. Furthermore, the inventive software system does not require specialized hardware, virtual memory or a complex operating system which greatly increase the cost of the output imaging device.

This application is intended to cover any adaptations or variations of the present invention. It is manifestly intended that this invention be limited only by the claims and equivalents thereof.

What is claimed is:

1. A software system for processing image data of one or more images received from at least one input imaging device for output on an imaging element, the software system comprising:

an image module for each image received from the input imaging device, wherein each image module applies at least one image processing function to the image data of the respective image, thereby generating processed image data;

a film module having a format defining at least one data region for the imaging element, wherein each data region is associated with one of the image modules;

a communication pipeline for each image module for communicating the processed image data; and an image processor for instantiating the film module, instantiating each image module, instantiating each communication pipeline and communicatively coupling each image module to the film module via the respective communication pipeline such that the film module receives the processed image data from the image module and generates output data for forming the images on the imaging element.

2. The software system of claim 1, wherein the image processor selects at least one image processing operation for each image received from the input imaging device, and further wherein the image processor configures the corresponding image module to perform the selected operation.

3. The software system of claim 2, wherein the image processing operation comprises applying a data filter to the image data.

4. The software system of claim 3, wherein the image processor constructs the data filter as a function of at least one stored data operator for performing a convolution operation.

5. The software system of claim 1 further comprising an image pump communicatively coupled to the film module, wherein the image pump receives the output data from the film module and drives an output device with the output data to form the images on the imaging element.

6. The software system of claim 1, wherein each of the image modules, the film module, the image processor and the communication pipelines are written in an object-oriented software language.

7. The software system of claim 6, wherein the image module represents an image box as defined by DICOM protocol and the film module represents a film box as defined by DICOM protocol.

8. The software system of claim 1, wherein at least one of the input imaging devices includes a medical imaging modality.

9. A computer for processing image data of one or more images received from at least one client for output on an imaging element, the computer comprising:
   a storage device storing a software system comprising:
      at least one image module, wherein each image module is associated with one of the images received from the client, and further wherein each image module applies at least one image processing function to the image data of respective image, thereby generating processed image data,
      a film module including a format parameter defining at least one data region of the imaging element, wherein each data region is associated with one of the image modules,
      a communication pipeline for each of the image modules, wherein each pipeline communicates the processed image data of the corresponding image module to the film module, and
      an image processor for instantiating the film module, instantiating each image module, instantiating each communication pipeline and coupling each image module to the film module via the respective communication pipeline such that the film module receives the processed image data from the image module and generates output data for forming the images on the imaging element;
   a random-access memory (RAM) for holding the instantiated film module, the instantiated image modules and the instantiated communication pipelines; and
   a central-processing unit (CPU) coupled to the storage device for executing the software system.

10. The computer of claim 9, wherein the image processor selects at least one image processing operation for each image received from the input imaging device, and further wherein the image processor configures the corresponding image module to perform the selected operation.

11. The computer of claim 10, wherein the image processing operation comprises applying a data filter to the image data.

12. The computer of claim 11, wherein the image processor constructs the data filter as a function of at least one stored data operator for performing a convolution operation.

13. The computer of claim 9, further comprising an image pump communicatively coupled to the film module, wherein the image pump receives the output data from the film module and drives an output device with the output data to form the images on the imaging element.

14. The computer of claim 9, wherein each of the image modules, the film module, the image processor and the communication pipelines are written in an object-oriented software language.

15. The computer of claim 9, wherein at least one of the clients is a medical imaging modality.

16. The software system of claim 9, wherein the image module represents an image box as defined by DICOM protocol and the film module represents a film box as defined by DICOM protocol.

17. The computer of claim 9, wherein the storage device is a read-only memory (ROM).

18. The computer of claim 9, wherein the storage device is a hard disk drive.

19. A computer-readable storage medium having an object-oriented software system executable on a suitably configured computer for processing image data of one or more images received from at least one client for output on an imaging element, the object-oriented software system comprising:
   at least one image module, wherein each image module is associated with one of the images received from the client, and further wherein each image module applies at least one image processing function to the image data of the respective image;
   a film module including a format parameter defining at least one data region on the imaging element, wherein each data region is associated with one of the image modules;
   a communication pipeline for each of the image modules, wherein each pipeline communicatively couples the corresponding image module to the film module, wherein the film module receives the processed image data from the image modules and generates output data for forming the images on the imaging element; and
   an image processor for instantiating the film module, instantiating each of the image modules, and coupling each image module to the film module via the respective communication pipeline according to the format parameter of the film module.

20. The storage medium of claim 19, wherein the image processor selects at least one image processing operation for each image received from the input imaging device, and further wherein the image processor configures the corresponding image module to perform the selected operation.

21. The storage medium of claim 20, wherein the image processing operation comprises applying a data filter to the image data.

22. The storage medium of claim 21, wherein the image processor constructs the data filter as a function of at least one stored data operator for performing a convolution operation.

23. The storage medium of claim 19, further comprising an image pump communicatively coupled to the film module, the image pump receiving the output data from the film module and communicating the output data to an output device for forming the images on the imaging element.

24. The storage medium of claim 19, wherein each image module, the film module, the image processor and the communication pipelines are written in an object-oriented software language.

25. The storage medium of claim 19, wherein the image module represents an image box as defined by DICOM protocol and the film module represents a film box as defined by DICOM protocol.

26. A medical imaging system comprising:

one or more clients, each client residing on a network;

a medical output imaging device; and an object-oriented software system executing on a suitably configured computer within the medical output imaging device for processing image data of one or more images received from at least one client for output on an imaging element by the medical output imaging device, the object-oriented software system comprising:

at least one image module, wherein each image module is associated with one of the images received from the client, and further wherein each image module applies at least one image processing function to the image data of the respective image, a film module including a format parameter defining at least one data region on the imaging element, wherein each data region is associated with one of the image modules, a communication pipeline for each of the image modules, wherein each pipeline communicatively couples the corresponding image module to the film module such that the film module receives the processed image data from the image modules and generates output data for forming the images on the imaging element, and an image processor for instantiating the film module, for instantiating each of the image modules, and for coupling each image module to the film module via the respective communication pipeline according to the format parameter of the film module.

27. The medical imaging system of claim 26, wherein the image processor selects at least one image processing operation for each image received from the input imaging device, and further wherein the image processor configures the corresponding image module to perform the selected operation.

28. The medical imaging system of claim 27, wherein the image processing operation comprises applying a data filter to the image data.

29. The medical imaging system of claim 26, further comprising an image pump communicatively coupled to the film module for receiving the output data from the film module and communicating the output data to the medical output imaging device for output on the imaging element.

30. The medical imaging system of claim 29, wherein the image module, the film module, the image processor, the communication pipeline and the image pump are written in an object-oriented software language.

31. The medical imaging system of claim 26, wherein at least one of the clients is a medical imaging modality.

32. The medical imaging system of claim 26, wherein the medical output imaging device further comprises:

a central-processing unit (CPU);

a random-access memory (RAM) coupled to the CPU; and a storage device coupled to the CPU, wherein the image module, the film module, the image processor and communication pipeline are fixed on the storage device and instantiated in the RAM by the CPU.

33. The medical imaging system of claim 32, wherein the storage device is a read-only memory (ROM).

34. The medical imaging system of claim 32, wherein the storage device is a hard disk drive.

35. A method for processing image data of one or more images received from at least one input imaging device for output on an imaging element comprising the steps of:

instantiating a film module having a format parameter defining at least one data region on the imaging element;

instantiating at least one image module, wherein each image module is associated with a data region defined by the film module, and further wherein each image module generates processed image data by applying at least one image processing function to the image data of one of the images received from the input imaging device and;

instantiating a communication pipeline for each image module for communicating the processed image data of a corresponding image module; and communicatively coupling each image module to the film module via a communication pipeline such that the film module receives the processed image data from the image modules and generates output data for forming the images on the imaging element.

36. The method of claim 35, further comprising the step of instantiating an image pump communicatively coupled to the film module for receiving the output data from the film module and driving an output device to form a visual representation of the images on the imaging element.

* * * * *